United States Patent [19]
Ohno et al.

[11] 3,785,247
[45] Jan. 15, 1974

[54] RECIPROCATING CUTTING MACHINE

[75] Inventors: Tadao Ohno; Namio Shimose; Shunzi Konomi, all of Kanagawa, Japan

[73] Assignee: Fuji Photo Film Co., Ltd., Kanagawa, Japan

[22] Filed: Dec. 29, 1971

[21] Appl. No.: 213,622

[30] Foreign Application Priority Data
Dec. 29, 1970 Japan.............................. 45/133145

[52] U.S. Cl. ........................................ 90/15, 51/40
[51] Int. Cl. ............................................. B23c 3/12
[58] Field of Search ...................... 90/15 R, 15.1 A, 90/15.1 B, 41, 53, 24 F, DIG. 2, 11 R; 144/185, 186, 117 R, 117 C; 51/40, 80 R, 81 R, 111 R

[56] References Cited
UNITED STATES PATENTS
| 2,580,778 | 1/1952 | Hexter et al. ............................ 51/40 |
| 901,716 | 10/1908 | Link ........................................ 90/41 |
| 3,592,103 | 7/1971 | Brown ............................ 90/11 R X |

*Primary Examiner*—Gil Weidenfeld
*Attorney*—Richard C. Sughrue et al.

[57] ABSTRACT

A cutting machine has the edges of two rotary side cutters rotating reversely to each other disposed at both sides of article to be cut by reciprocating cutters across the work piece.

2 Claims, 2 Drawing Figures

PATENTED JAN 15 1974 3,785,247

RECIPROCATING CUTTING MACHINE

BACKGROUND OF THE INVENTION

1. Field of the Invention

This invention relates to a device for removing the burrs or iron or non-ferrous metal during production, and particularly synthetic resin such as plastic simultaneously with the step of cutting.

2. Description of the Prior Art

Heretofore, the aforesaid burrs are removed by first removing the article to be cut from a jig and again cutting it from the reverse direction or by carrying it to another device to again work it. These methods require time to settle and remove the jig to increase the number of steps, and introduces descreased operating efficiency. When the sheets such as paper or film are cut in superimposition, the lowermost part is improperly cut to introduce a loss as its disadvantage.

SUMMARY OF THE INVENTION

This invention eliminates the aforementioned disadvantages of the conventional machines and provides an improved reciprocating cutting machine which reduces the number of steps and increases the operating efficiency, and prevents the loss due to the improper cutting of sheets as aforementioned.

According to one aspect of this invention, there is provided a cutting machine which comprises cutters, with cutting edges rotating reversely to each other and disposed at respective sides of the article to be cut so as to each other and disposed at respective sides of the article to be cut so as to cut it by reciprocating the cutters.

Reference is now made to the drawings, which show one embodiment of the machine of this invention.

Figure 1:
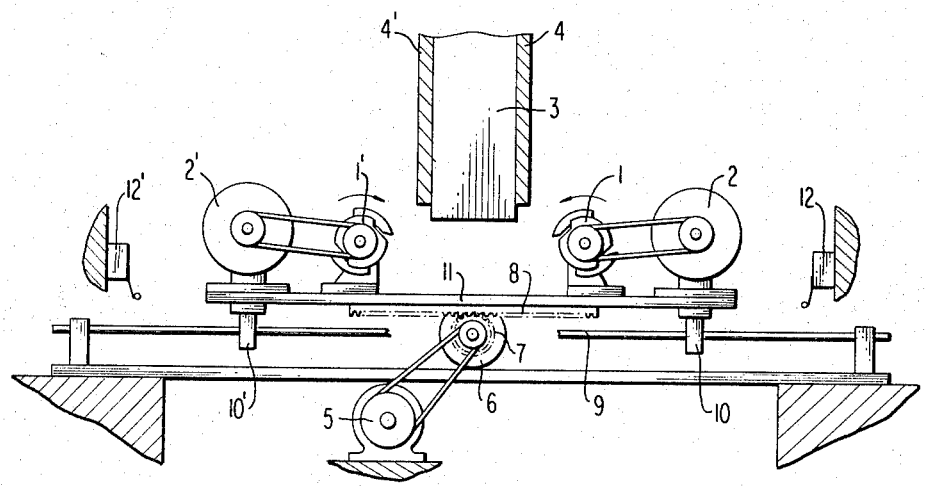
In FIG. 1, reference numerals 1 and 1' illustrate rotary cutter shown in detail in FIG. 2 driven in the direction of the arrows by electric motors 2 and 2', respectively, fixed on a movable plate 11. A rack 8 is provided on the movable plate 11, for driving laterally in rightward and leftward direction the movable plate 11 in engagement with the pinion 7. The pinion 7 is disposed on the same shaft as a double clutch 6 to be driven by the electric motor 5. Under the motors 2 and 2' of the movable plate 11 are provided bearings 10 and 10' so that the movable plate 11 may slide on the guide 9. Numeral 3 shows an article to be cut fixed by jigs 4 and 4'.

In operation of the thus constructed machine, after the article 3 is fixed to the jigs 4 and 4', at first, the article 3 is cut by the rotating edge of the cutter 1 by moving the movable plate 11 to the left. Stopping is sensed by the detecting switch 12' so as to switch the double clutch by the signal derived of the seithc 12' to reverse the pinion 7 to move the movable plate 11 to the right to cut the rest of the article 3 by the rotary cutter 1' to complete the cutting. The stopping position at this time is determined by the detecting switch 12.

Figure 2:
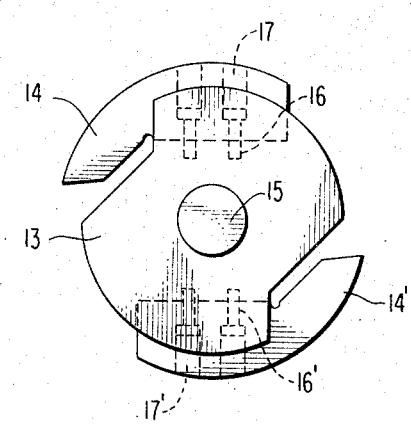

FIG. 2 shows one example of a rotary cutter used in the machine of this invention, showing one side of the edge. The cutting edges 14 and 14' are fixed to a holder 13 on a rotary shaft 15, by machine screws 16 and 16'. The edge 14 has a long hole 17 enabling adjustment by moving it back and forth in a radial direction.

It should be understood from the foregoing description that since the cutting machine of this invention comprises two rotary cutters rotating reversely to each other disposed respectively at both sides of an article to be cut, thereby cutting the article by reciprocating the cutters alternatively from both sides, it provides a simple structure to remove the burrs with a single step to provide a smooth cutting.

What is claimed is:

1. A cutting machine for cutting a work piece along an edge of the same from one side to the other side, said machine comprising:

a plate,
   means supporting said plate for reciprocation linearly along a path parallel to said work piece edge from side to side,
   rotary cutters positioned on said plate at laterally spaced positions in excess of the width of said work piece and being initially positioned on respective sides work piece, and
   means for rotating said cutters in opposite directions, and
   means for reciprocating said plate such that said cutter alternately engage respective sides of said work piece at said edge to effect cutting along the edge from both sides inwardly to eliminate the production of burrs at both sides during edge severance.

2. The cutting machine as claimed in claim 1 wherein said means for rotating said cutters comprises electric motors carried by said plate and wherein said plate has fixed thereto a rack extending lengthwise of the same and said machine further includes a motor driven pinion engaging said rack to effect said reciprocation of said plate.

* * * * *